(12) United States Patent
Beckwith

(10) Patent No.: US 6,206,558 B1
(45) Date of Patent: *Mar. 27, 2001

(54) EXTRUSION SYSTEM

(75) Inventor: Robert W. Beckwith, Cummaquid, MA (US)

(73) Assignee: Sencorp Systems, Inc., Hyannis, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,038

(22) Filed: Mar. 27, 1998

(51) Int. Cl.$^7$ ........................................................ B29B 7/42
(52) U.S. Cl. .............................. 366/78; 264/50; 366/87; 425/4 C; 425/199
(58) Field of Search .................................... 210/175, 194, 210/447, 767, 774; 366/75, 79, 87–89; 425/4 C, 197, 198, 199, 817 C; 219/198.1; 264/50, 51, 53

(56) References Cited

U.S. PATENT DOCUMENTS

| | | |
|---|---|---|
| 3,193,877 * | 7/1965 | Edwards ................................ 366/75 |
| 3,360,824 * | 1/1968 | Schippers ............................... 366/87 |
| 3,856,277 | 12/1974 | Tiramani . |
| 4,419,309 * | 12/1983 | Krutchen ................................ 264/53 |
| 4,436,679 | 3/1984 | Winstead . |
| 4,476,077 * | 10/1984 | Bullard et al. ......................... 264/53 |
| 4,615,664 * | 10/1986 | Kolossow .............................. 425/4 C |
| 5,045,255 | 9/1991 | Kurz . |
| 5,129,728 | 7/1992 | Winstead . |
| 5,419,634 * | 5/1995 | Bacher et al. ......................... 366/88 |
| 5,651,944 * | 7/1997 | Schulz et al. .......................... 366/88 |

* cited by examiner

Primary Examiner—Joseph W. Drodge
(74) Attorney, Agent, or Firm—Dickstein Shapiro Morin & Oshinsky LLP

(57) ABSTRACT

An extrusion system is provided with a screen changer between in-line screw sections. An in-line seal diverts high pressure, high temperature foamable material toward the screen changer. The seal may have reverse flights to provide a visco-dynamic seal. The screw sections and the seal may be located in a common barrel housing. The screw sections and the seal may be integrally rotated as a single in-line unit. A device including an injection valve may be attached to the upstream screw section to introduce a foaming agent into the material being extruded.

10 Claims, 1 Drawing Sheet

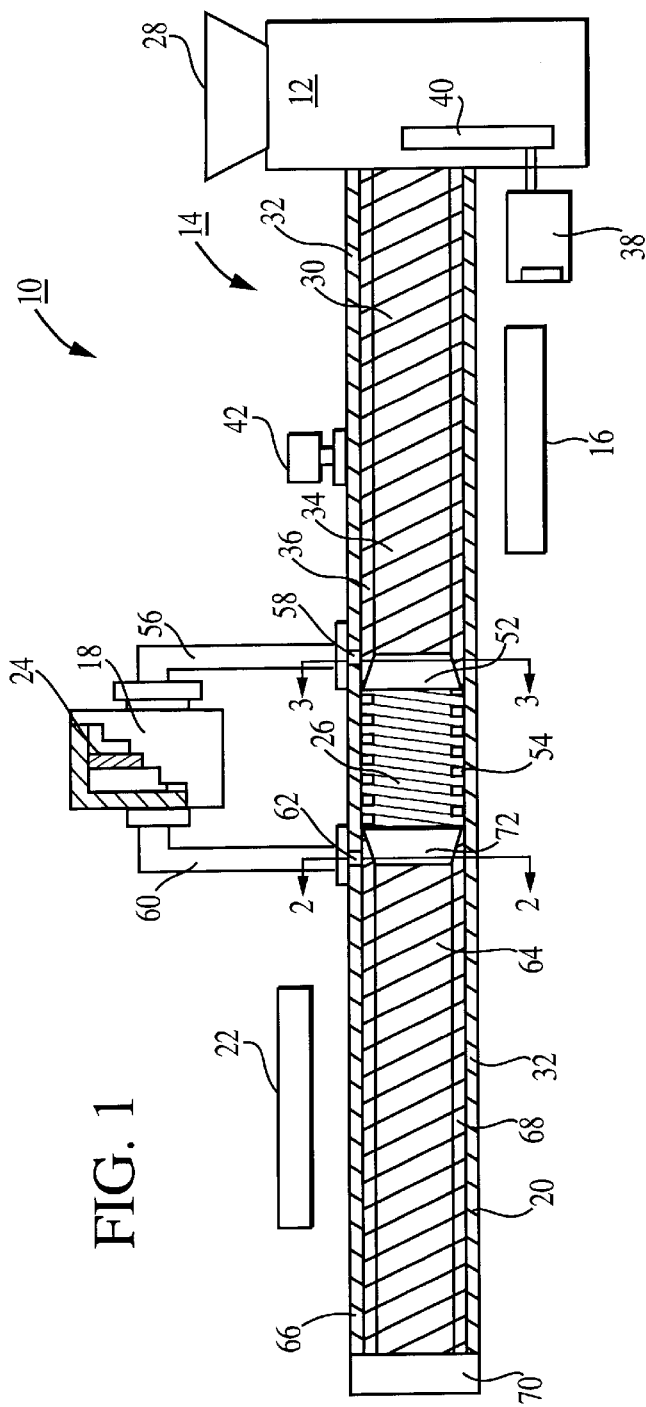
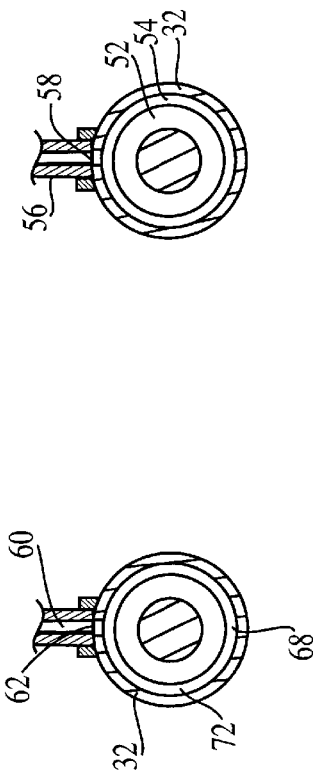
FIG. 1
FIG. 2
FIG. 3

EXTRUSION SYSTEM

BACKGROUND OF THE INVENTION

The present invention relates generally to single extruder systems for processing, screening and extruding foamable plastic material. More particularly, the invention relates to a system for flowing plastic material through a screen changer at an upstream point where the material is at relatively high temperature and pressure.

To manufacture foam plastic products, it is known to flow molten foamable material through a screw extruder, then through a screen changer, and then through a die. The molten material is cooled as it flows through the extruder. The cooled material should have sufficient viscosity to prevent premature foaming.

High viscosity material, however, may require a larger or more complicated screen changer. If the screen changer is not large enough, the pressure drop across the screen changer may cause premature foaming. Also, the increased pressure demand at the end of the extruder results in more shear heat in the extrudate, lessening cooling efficiency.

A prior art screen changer is shown in U.S. Pat. No. 3,856,277 (Tiramani).

SUMMARY OF THE INVENTION

The problems and disadvantages of the prior art are overcome to a great extent by providing a foam extrusion system with a screen operatively located between first and second in-line screw sections.

In one aspect of the invention, a seal structure directs the molten material from the first screw section and toward the screen. In a preferred embodiment, the seal structure has reverse flights to provide a visco-dynamic seal. Preferably, the reverse flights cause a small amount of molten material to be recycled upstream, eliminating stagnation and eventual degradation of the extrudate.

In another aspect of the invention, the seal structure is rotated by the first screw section, and the rotation of the second screw section is driven by the seal structure. In a preferred embodiment, the screw sections and the seal structure are integrally connected together and located within a common barrel-shaped housing.

The screen may be located within a screen changer. In a preferred embodiment of the invention, a system of bypass conduits provide fluid communication between the barrel housing and the screen changer.

In another aspect of the invention, foamable plastic material is extruded by rotating a primary screw section, a seal section, and a secondary screw section, and by causing the material to flow through the primary screw section, then through the screen changer, and then through the secondary screw section. In a preferred method, the plastic material has a gaseous foaming agent entrained therein. As an alternative, the screen changer can be positioned at a location along the barrel before the foaming agent is injected into the process.

An object of the invention is to provide an economical, uncomplicated and easy to use foam extrusion system.

Another object of the invention is to provide an extrusion system that does not require a large screen and screen changer.

Another object of the invention is to locate a screen changer midway within a single extrusion line. Preferably, the plastic material is relatively cool and viscous at the downstream end of the line, near the die. The screen changer may be located at a point where the plastic material is at relatively high temperature (and hence lower viscosity) and where a pressure drop is more acceptable to the process.

Another object of the invention is to avoid stagnation and degradation of plastic material within the extrusion system. In a preferred embodiment of the invention, stagnation is avoided by providing the seal with reverse flights. The seal is rotated integrally with the screw sections. Consequently, the reverse flights cooperate with the interior of the barrel housing to cause a small amount of plastic material to recycle through the screen changer.

The present invention provides an uncomplicated drive system for an extrusion system. This object may be achieved by constructing the seal as an integral driven part of the screw sections. With this arrangement, the second screw section may be driven directly from the rotation of the first screw section. The invention avoids the need for multiple, flighted extruders.

The present invention may be used with a wide variety of plastic materials and foaming agents, including but not limited to, high and low density polyethylene, polystyrene, polypropylene, PET and the like.

These and other objects, features and advantages of the invention will become apparent from the following detailed description of preferred embodiments of the invention.

BRIEF DESCRIPTION OF THE DRAWINGS

FIG. 1 is a partially broken away side view of an extrusion system constructed in accordance with the present invention.

FIG. 2 is a cross sectional view taken along line 2—2 of FIG. 1.

FIG. 3 is a cross-sectional view taken along line 3—3 of FIG. 1.

DETAILED DESCRIPTION OF PREFERRED EMBODIMENTS

Referring now to the drawings, where like reference numerals designate like elements, there is shown in FIG. 1 an extrusion system 10 for producing molten foamable plastic material (not illustrated). The extrusion system 10 has an inlet unit 12, a primary screw section 14, a heater 16, a screen changer 18, a secondary screw section 20, and a cooler 22. In operation, plastic material is fed into the inlet unit 12, conveyed downstream (from right to left as viewed in FIG. 1) through the primary screw section 14, and melted by the heater 16. The molten material flows through a screen 24 in the screen changer 18, conveyed through the secondary screw section 20, and cooled by the cooler 22.

A seal structure 26 is used to divert the flow of molten material through the screen changer 18. The seal structure 26 is also used to integrally drive the secondary screw section 20 with the primary screw section 14, as discussed in more detail below.

The inlet unit 12 may have a hopper 28 for gravimetrically or volumetrically receiving and blending plastic pellets (not illustrated). The pellets flow by gravity from the hopper 28 into the primary screw section 14. The illustrated system 10 may be used to process two hundred to eight hundred pounds (ninety to three hundred sixty kilograms) of plastic material or more per hour.

The primary screw section 14 has a primary screw 30 located within a barrel housing 32. The screw 30 has a cylindrical core 34 and screw threads 36. The screw threads 36 cooperate with the interior cylindrical surface of the housing 32 such that rotation of the screw 30 causes the plastic material to flow downstream. The housing 32 is shown in longitudinal cross section in FIG. 1.

The screw 30 may be rotated by a suitable motor 38. The motor 38 is operatively connected to the screw 30 by suitable gears 40 shown schematically within the inlet unit 12.

As the material flows downstream through the primary screw section 14, it is melted by the heater 16. The heater 16 may be an electric resistance heater or any other suitable heating means.

A suitable foaming or blowing agent is injected into the molten stream of plastic material by a suitable injection valve apparatus 42, which can be located anywhere in the primary section.

In the illustrated embodiment, the seal 26 is integrally connected to the primary screw 30. This way, the seal 26 rotates in unison with the primary screw 30. The seal 26 has reverse flights 54 on its periphery for cooperating with the interior surface of the barrel housing 32 to create a visco-dynamic seal.

The seal structure 26 may be integrally and drivingly connected to the cylindrical core 34 by a conical portion 52. The smaller diameter of the conical portion 52 matches the cylindrical core 34. The larger diameter of the conical portion 52 matches the cylindrical root of the flighted seal structure 26.

The seal 26 rotates in the same direction as the primary screw 30. Consequently, the reverse flights 54 cause a thin layer of molten plastic material to flow upstream between the seal 26 and the interior surface of the barrel housing 32. An advantage of the illustrated arrangement is that molten material does not become stagnant between the exterior surface of the seal 26 and the interior surface of the barrel housing 32. If such material were to become stagnant, it could become degraded by heat.

A bypass conduit 56 is connected to a hole 58 (FIG. 3) immediately upstream of the seal 26. The seal 26 causes molten plastic material to flow through the bypass conduit 56 to the screen changer 18. A second bypass conduit 60 is connected to the downstream end of the screen changer 18. The second bypass conduit 60 is connected to a hole 62 (FIG. 2) in the barrel housing 32 immediately downstream of the seal 26. In alternative embodiments, the screen changer 18 and bypass structure 56, 60 can be located anywhere along the primary section where the plastic would be molten.

Thus, high pressure molten material conveyed by the primary screw section 14 is diverted through the screen changer 18 by the combined operation of the bypass conduits 56, 60 and the seal 26. A small amount of plastic material is visco-dynamically recycled upstream across the seal 26.

The screen 24 removes impurities from the molten material in a manner known in the art. The screen changer 18 changes the screen 24 from time to time in a manner known in the art. An advantage of the invention is that the foamable material may be pressurized and highly fluid at the point where it flows through the screen changer 18. With this feature, the screen changer 18 does not have to be large or complicated to avoid pressure loss which could cause pre-foaming.

Most of the molten material returning to the barrel housing 32 through the second bypass conduit 60 is conveyed further downstream by the secondary screw section 20. The secondary screw section 20 has a secondary screw 64 with a cylindrical core 66 and threads 68. The threads 68 cooperate with the interior surface of the cylindrical barrel housing 32. The cylindrical core 66 is integrally and drivingly connected to the seal structure 26 by a conical portion 72. The smaller diameter of the conical portion 72 matches the cylindrical core 66. The larger diameter of the conical portion 72 matches the root of the seal structure 26.

The cooler 22 reduces the viscosity of the molten material before it is extruded through an appropriate die 70. The cooler 22 may be a heavy duty cooler, high flow cooling jackets or direct barrel cooling. The cooler 22 may be, for example, of the type employed by Sencorp Systems, Inc., Hyannis, Mass. The barrel housing 32 may be cooled by air or water or by any other suitable cooling means.

If desired, the operation of the heater 16, the cooler 22, the motor 38, and other components of the system 10 may be monitored by suitable transducers (not illustrated) and controlled by a central processing unit (not shown). Information from the transducers may be presented at a suitable control panel (not illustrated).

The illustrated system 10 may be used to make a wide variety of end products, including, but not limited to, bottle wrap labels, anti-slip mats, medium density thin wall foam for hamburger packs, film laminated or extrusion coated foam for tableware, high density foam for egg boxes, low density foam for meat trays, low/medium density foam for paper laminated display board, and low density foam for insulation sheet, wall panels and insulation board.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. A foam extrusion apparatus, comprising:
   a downstream screw section;
   an upstream screw section for moving foamable plastic material toward said downstream screw section, said upstream screw section being in line and rotatably connected to said downstream screw section;
   a device for introducing a foaming agent into said upstream screw section, said device being attached to said upstream screw section; and
   a screen located prior to said downstream screw section, said screen being located between said foaming agent device and said downstream screw section.

2. The apparatus of claim 1, further comprising a seal structure operatively located between said screw sections.

3. The apparatus of claim 2, wherein said seal structure includes screw threads for causing the foamable material to flow toward said upstream screw section.

4. The apparatus of claim 3, further comprising a barrel structure, and wherein said screw sections and said seal structure are located within said barrel structure.

5. The apparatus of claim 4, further comprising a first bypass conduit for providing fluid communication between said upstream screw section and said screen, and a second bypass conduit for providing fluid communication between said screen and said downstream screw section.

6. The apparatus of claim 5, wherein said seal structure is drivingly connected to said screw sections, such that rotation of said upstream screw section causes rotation of said seal structure and said downstream screw section.

7. An apparatus for handling foamable plastic material, said apparatus comprising:

a screen changer;

a conduit system for causing the foamable plastic material to flow through said screen changer, said conduit system having an upstream end and a downstream end, said conduit system having an upstream screw section located in said upstream end, and said conduit system having a downstream screw section located in said downstream end, said screen changer being operatively located between said ends of said conduit system;

an injection valve for injecting a foaming agent into said conduit system; and a rotating seal for directing the foamable material into said upstream end of said conduit system, said seal being operatively located between said downstream end and said foaming agent injection valve; said upstream screw section being integrally connected to said rotating seal, and said rotating seal being itegrally connected to said upstream screw section, such that said upstream and downstream screw sections are rotatably connected to each other.

8. The apparatus of claim 7, further comprising a primary screw section for rotating said seal and for causing the foamable plastic material to flow toward said upstream end of said conduit system.

9. The apparatus of claim 8, further comprising a secondary screw section for causing the foamable material to flow away from said downstream end of said conduit system, said secondary screw section being rotated by said seal.

10. The apparatus of claim 9, further comprising a barrel structure, said screw sections and said seal being located within said barrel structure, said ends of said conduit system being connected to said barrel structure.

* * * * *